US007484185B2

(12) United States Patent
Farrington et al.

(10) Patent No.: US 7,484,185 B2
(45) Date of Patent: Jan. 27, 2009

(54) SEARCHING AND DISPLAYING HIERARCHICAL INFORMATION BASES USING AN ENHANCED TREEVIEW

(75) Inventors: Shannon Matthew Farrington, Gilroy, CA (US); Tracy Hutcheson, Salinas, CA (US); Wei Zhou, Pacifica, CA (US)

(73) Assignee: International Business Machines Corporation, Armonk, NY (US)

( * ) Notice: Subject to any disclaimer, the term of this patent is extended or adjusted under 35 U.S.C. 154(b) by 574 days.

(21) Appl. No.: 10/146,885

(22) Filed: May 17, 2002

(65) Prior Publication Data
US 2003/0214538 A1    Nov. 20, 2003

(51) Int. Cl.
G06F 3/048 (2006.01)
(52) U.S. Cl. ............... 715/860; 715/818; 715/853; 707/3
(58) Field of Classification Search ............ 715/738, 715/825, 826, 828, 840, 853, 854, 855, 514, 715/712, 713, 817, 818, 822, 823, 860; 707/1–3, 707/100–102
See application file for complete search history.

(56) References Cited

U.S. PATENT DOCUMENTS

| | | | |
|---|---|---|---|
| 5,504,853 A | 4/1996 | Schuur et al. | |
| 5,905,498 A | 5/1999 | Diament | |
| 6,055,515 A | 4/2000 | Consentino et al. | |
| 6,101,498 A | 8/2000 | Scaer et al. | |
| 6,112,024 A | 8/2000 | Almond et al. | |
| 6,147,687 A * | 11/2000 | Wanderski | 715/853 |
| 6,154,128 A * | 11/2000 | Wookey et al. | 340/506 |
| 6,484,190 B1 * | 11/2002 | Cordes et al. | 715/514 |
| 6,727,927 B1 * | 4/2004 | Dempski et al. | 715/853 |
| 7,124,148 B2 * | 10/2006 | Sauermann | 707/103 R |
| 2001/0044837 A1 * | 11/2001 | Talib et al. | 709/219 |

(Continued)

FOREIGN PATENT DOCUMENTS

EP     0 647 909 A1    4/1995

(Continued)

OTHER PUBLICATIONS

Cardenas, et al, The Knowledge-Based Object-Oriented PICQUERY+ Language, IEEE Transactions on Knowledge and Data Engineering, vol. 5, No. 4, Aug. 1993, pp. 644-657.

(Continued)

Primary Examiner—Ba Huynh
(74) Attorney, Agent, or Firm—Sughrue Mion, PLLC

(57) ABSTRACT

The invention relates to a method and apparatus for specifying a criteria for searching an information hierarchy and displaying search results in a tree-based view that indicates the location of matching elements within the information hierarchy. The location of matching elements within the information hierarchy is emphasized using techniques that include highlighting instances of matching elements within a treeview display, graphically connecting a plurality of matching elements within a treeview display, and displaying a first matching element while presenting a graphical link to the next matching element within the treeview display. Search criteria can be specified using a pop-up search-test input window, or by simply right/left/double clicking upon an element within the information hierarchy. Search results are displayed within a treeview display that presents matching elements within the path-based context of the original information hierarchy but in which non-matching elements are selectively hidden based upon user configuration options selected.

40 Claims, 13 Drawing Sheets

U.S. PATENT DOCUMENTS

| | | | |
|---|---|---|---|
| 2002/0087509 A1* | 7/2002 | Meirsonne | 707/1 |
| 2002/0111870 A1* | 8/2002 | Chinnappan et al. | 705/26 |
| 2002/0152222 A1* | 10/2002 | Holbrook | 707/104.1 |
| 2003/0098893 A1* | 5/2003 | Makinen | 345/853 |
| 2004/0030653 A1* | 2/2004 | Christensen | 705/51 |
| 2005/0021513 A1* | 1/2005 | Vedula et al. | 707/3 |
| 2005/0240881 A1* | 10/2005 | Rush et al. | 715/851 |

OTHER PUBLICATIONS

Burns et al, A Graphical Entity-Relationship Database Browser, IEEE, 1998, pp. 694-704.

Ammar et al, A Graphical Interface for Modeling a Hierarchy of Performance Models for Software Systems, IEEE, 1990, pp. 646-651.

Tool for Display and Traversal of Network or Hierarchical Information, IBM Technical Disclosure Bulletin, vol. 39, No. 11, Nov. 1996, pp. 3-4.

Tree List, a Dialog Object for Viewing, Assigning Values to, and Creating Hierarchical Data Structures, IBM Technical Disclosure Bulletin, vol. 37, No. 03, Mar. 1994, pp. 399-401.

* cited by examiner

SEARCHING AND DISPLAYING HIERARCHICAL INFORMATION BASES USING AN ENHANCED TREEVIEW

BACKGROUND

1. Field of the Invention

The invention relates to information storage, retrieval and presentation systems. More particularly, it relates to new techniques for the efficient presentation of hierarchical information via a Graphical User Interface (GUI) treeview structure.

2. Description of the Related Art

Tree based views are in common use in a wide variety of applications to visually display and provide access to hierarchically organized information. Common examples of such hierarchical information include: electronic file management structures; database file, record, and field structures; software modules, procedures, and sub-procedures; and practically any information base in which the information elements contained within are related via a successive series of parent/child relationships.

The graphical user interface (GUI) based treeview is a structure found in many products such as electronic file management applications, database development and administration tools, and software development editors. Such products typically allow a user to navigate the treeview via a GUI interface that supports vertical and horizontal scrolling and the expansion and compression of the treeview information branches. Compressed branches of the tree can be selected and expanded to reveal underlying elements, which in turn can be expanded. Expanded branches can be selected and compressed to display only the previously expanded parent element.

FIG. 1, presents a recorded screen display or window 102 from a computer running an electronic file management application. The features presented in FIG. 1 are representative of a GUI application window 102 that incorporates a traditional treeview. Standard features included an application menu bar 104, a set of quick action buttons 106, and an address bar 108 that displays the position within the hierarchy structure of the currently selected treeview element. The treeview itself is typically presented in a left-hand portion, or pane 110 of the window, that displays a nested hierarchy of information organized under a root element 114. By using the cursor to double click on the root element 114 the treeview is expanded to display a secondary tier of elements 116. Elements that contain additional hierarchy elements are typically identified with a graphical indicator such as a "+." Elements which have already been expanded are typically marked with a graphical indicator such as a "−." Branches of the tree can typically be expanded or compressed by clicking on these graphical indicators. A right-hand portion, or pane 112 of the window, displays the contents of the currently selected element. If the selected element is a node within a directory structure, the contents displayed is the next layer of elements 120. Depending upon the nature of the application, however, if the selected treeview element were a pointer to a data structure or a text file, the right-hand pane 112 can be used to display the contents of the data structure or text file, respectively.

Although expansion and compression of treeview elements facilitates manual browsing of the information hierarchy, the majority of existing tools also support a treeview search facility that allows a user to quickly locate specific information elements within the treeview. FIG. 2 presents a representative search control pop-up window 122 supported by the electronic file management application and invoked via the menu option "Tools/Find." A user can specify search criteria 124/126, the location in the hierarchy below which the application is to search 128, and initiate the search by clicking on the "Find Now" button 130.

Unfortunately, the majority of such search routines do not return search results within the context of the treeview display. For example, as shown in FIG. 3, the electronic file management application returns search results 134 within a secondary search window 132, entirely separate from the original treeview display window. Only a text based path is provided to indicate the location of an individual element within the information hierarchy. As a consequence, the search results are presented in a manner that is disjointed from the graphical treeview context in which the results can be most intuitively viewed. The user is forced to shift his or her attention back and forth between the text based search results window and the graphical treeview window in order to manually locate the text based search results within the context of the graphical treeview, at the expense of substantial inefficiency and human error.

FIG. 4, presents the GUI interface 202 to a typical operating system (O/S) administration tool used to edit operating system data files. The menu options 204, right-hand and left-hand display windows or panes 210/212, treeview elements 214/218, and search pop-up window 222 operate in the same manner as described in relation to the electronic file management application previously discussed.

Search results returned by the O/S file editor, however, are not returned in a separate window. When a search is initiated the treeview is expanded to display the first matching element, and the search is discontinued. For example, FIG. 5 presents the initial results of a search performed within an O/S file editor that incorporates a traditional treeview for a element containing the letters "net." As shown in FIG. 5, upon locating the first element within the treeview containing the letters "net," the O/S file editor expands the tree and highlights the matching element 234 within the context of the treeview. However, the search results are presented within the treeview left-hand pane 210, without compressing or hiding irrelevant portions of the tree. As a consequence, the treeview display contains a large amount of irrelevant information 236 that deprives the user of the hierarchical context that the treeview based display is meant to preserve. As demonstrated in FIG. 5, the expanded treeview has so many elements that upon expanding even a single branch, none of the relationships with respect to parent elements are visible within the display. To determine the hierarchical context of the search results, a user is forced to scroll upwards through a significant number of irrelevant treeview elements to determine the identity of the parent element in the information hierarchy. Such a presentation of search results is often as cumbersome as receiving search results in a separate GUI window that presents text based paths.

Another drawback of the approach used by this O/S file editor using a traditional treeview is that upon locating a first matching element the search terminates, requiring the user to re-execute the search to find the next matching term. If a large number of matches exist, such an approach is quite exhaustive. Furthermore, the user is never presented with a comprehensive assessment of the number of total matches within the information hierarchy, nor a way of easily navigating between matching elements.

Hence, there remains a strong need for methods and apparatuses that allow treeview representations of hierarchical information to be quickly and effectively searched. Further, there is a strong need for an enhanced treeview that is capable of presenting the results of such a search efficiently and effectively within the context of the treeview hierarchy together with summary information such as the number of matching elements located by a search.

SUMMARY

Therefore, in light of the above, and for other reasons that will become apparent when the invention is fully described, an enhanced treeview tool is described here that is executable by a computer and capable of searching an information hierarchy for elements matching a user specified search criteria. The enhanced treeview displays the search results within the treeview in a manner that indicates the location of matching elements within the information hierarchy. The treeview tool can emphasize the location of matching elements using techniques that include highlighting instances of matching elements within the treeview, graphically connecting a plurality of matching elements within the treeview, or displaying a first matching element with summary statistical information (e.g., a numeric indicator of the number of matches found) and presenting a graphical link to the next matching element within the treeview. The enhanced treeview described here allows segments of the information hierarchy display to be optimally expanded and/or compressed and allows elements within expanded branches to be viewed or hidden, in order to optimize the presentation of search results to the user.

The above features and advantages of the invention will become apparent upon consideration of the following descriptions and descriptive figures of specific embodiments thereof. While these descriptions go into specific details of the invention, it should be understood that variations may and do exist and would be apparent to those skilled in the art based on the descriptions herein.

DETAILED DESCRIPTION

Figure 1:
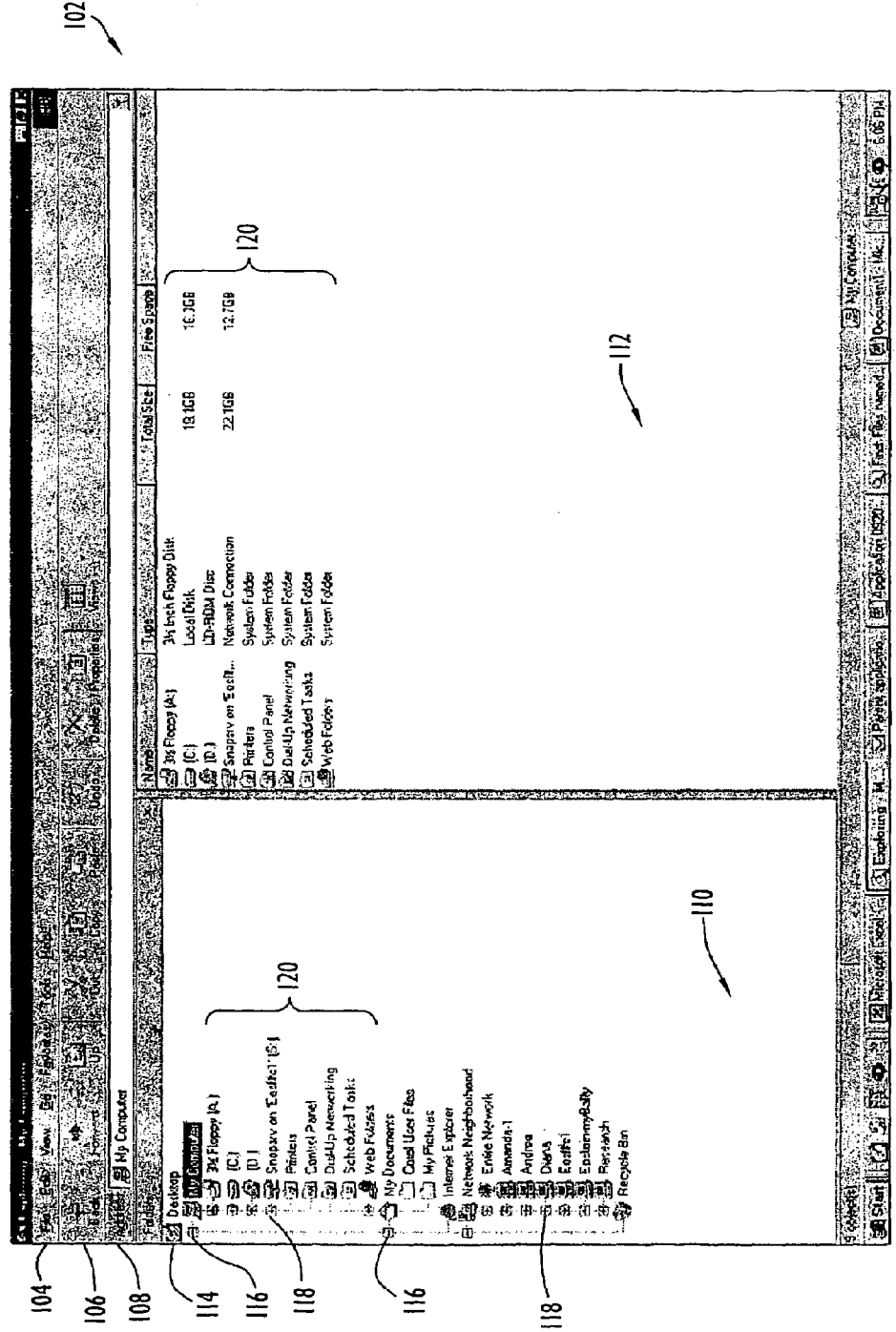
FIG. 1 is a recorded screen display depicting a first application embedding a typical treeview display.
Figure 2:
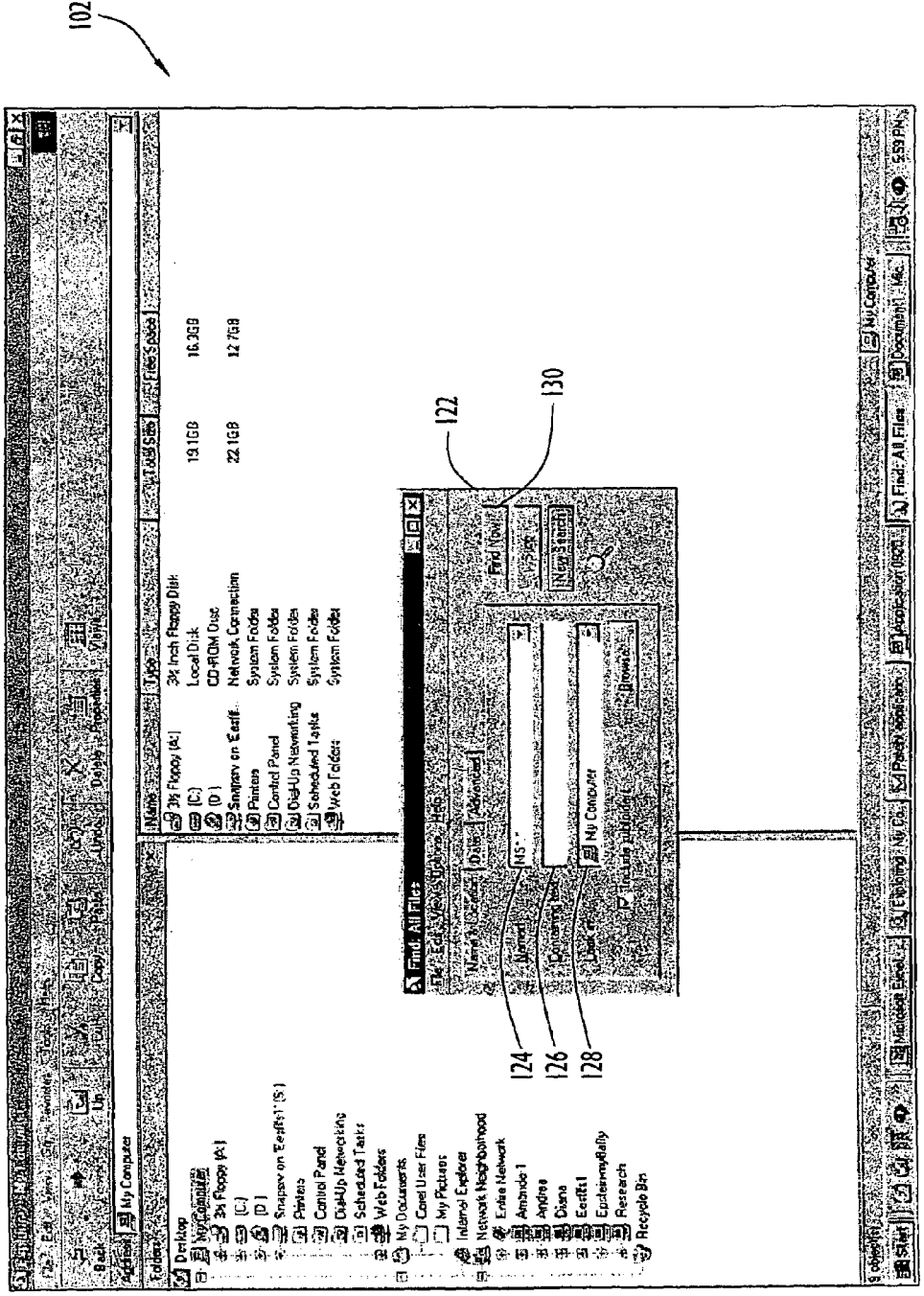
FIG. 2 is a recorded screen display depicting a pop-up search window associated with the first application.
Figure 3:
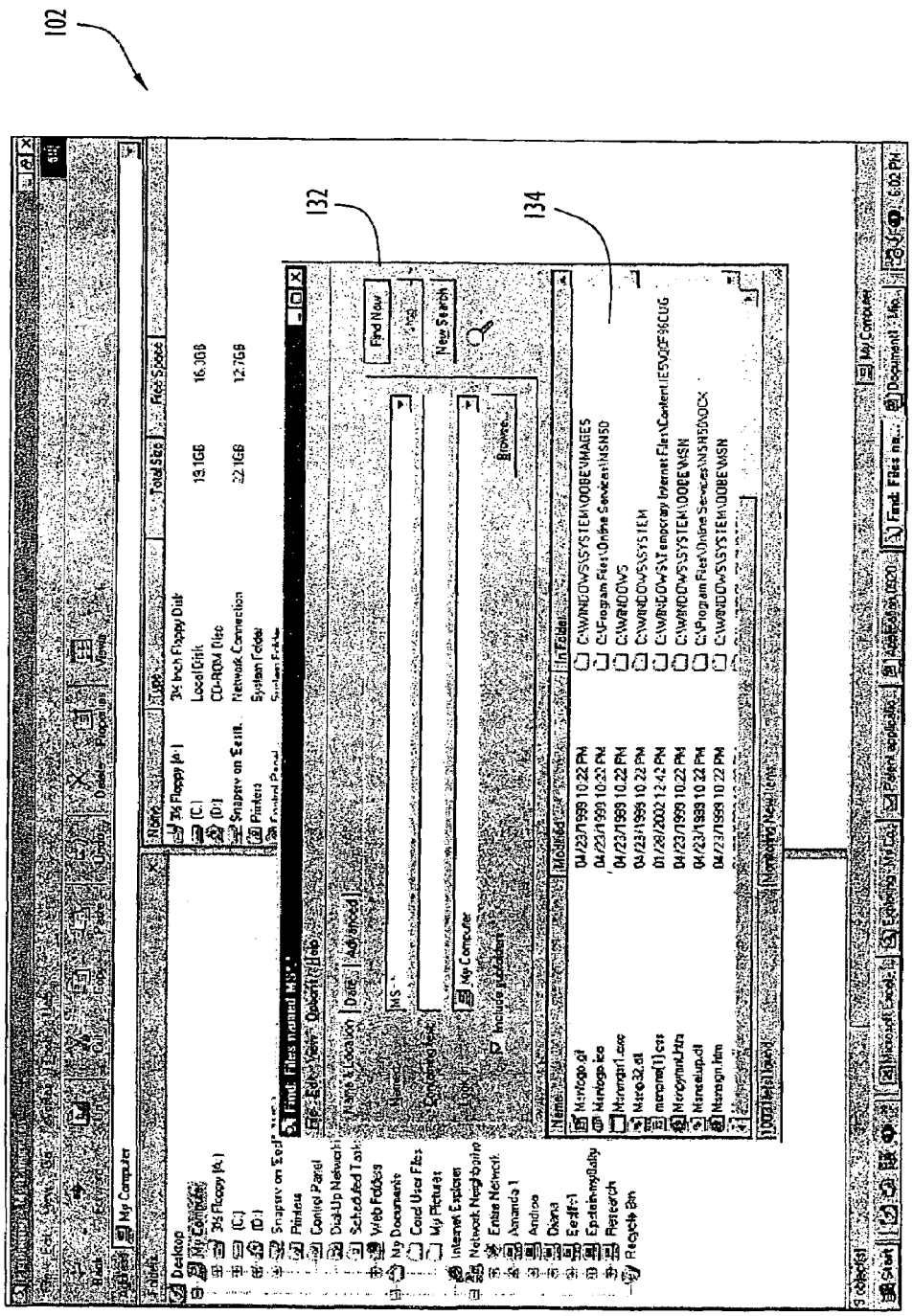
FIG. 3 is a recorded screen display depicting search results as presented by the first application.

The embodiments described below are described with reference to the above drawings, in which like reference numerals designate like components.

Figure 6:
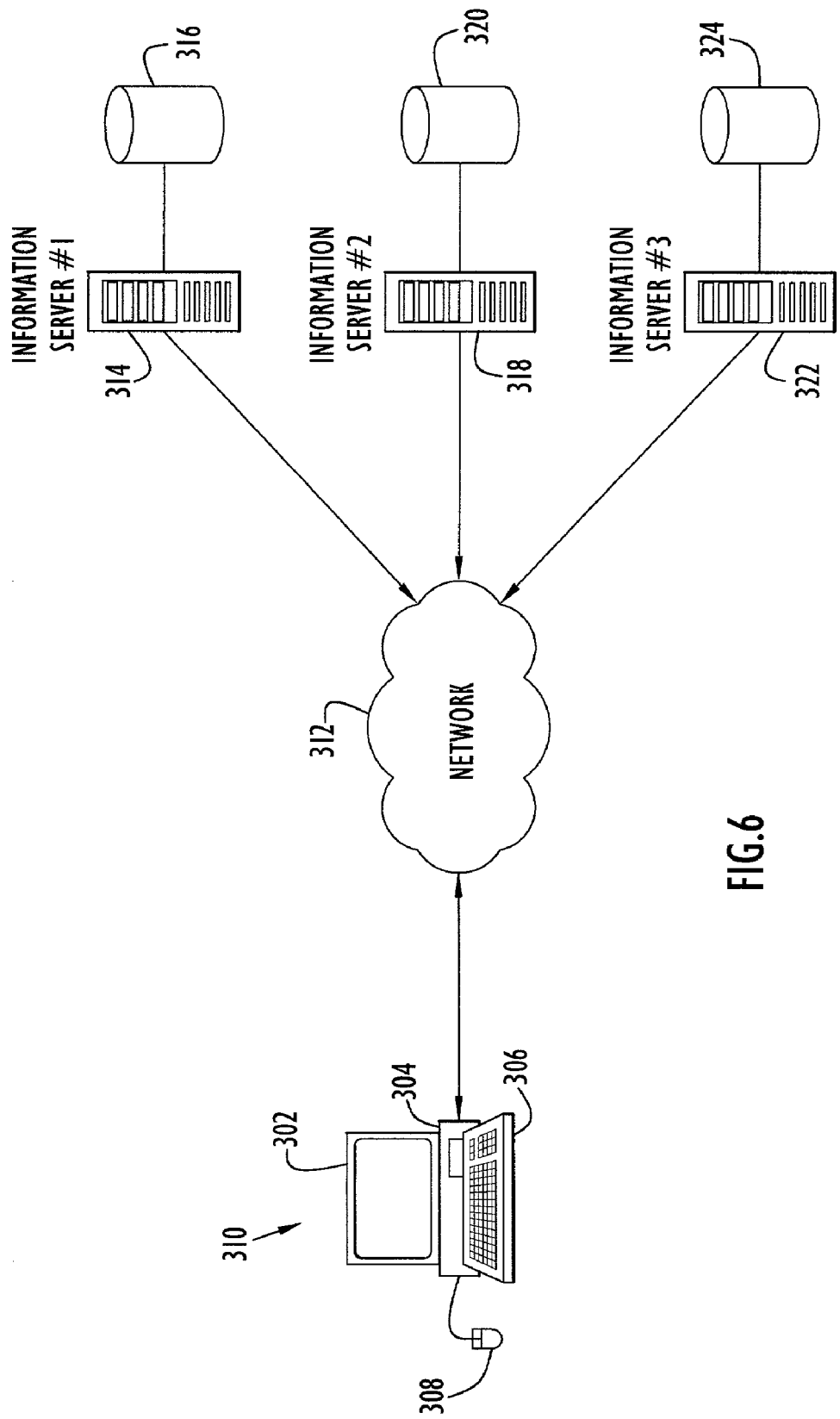
FIG. 6 depicts a networked computing environment typical of the environment in which methods and tools described herein will be used.

A system capable of supporting multiple embodiments of a treeview tool for viewing and searching hierarchical information is illustrated in FIG. 6. Specifically, the system can include a client in an end-user computer system 310 in communication with or connected to a network 312, such as the Internet, and one or more server computer systems (314, 318 and 322), each with their respective storage devices (316, 320 and 324).

The treeview based methods and apparatuses described here are applicable to a wide range of hierarchically organized information. Such hierarchical information can originate from one or more source files or databases stored within the end-user computer system 310, or it can originate from multiple source files and databases stored on one or more remote servers (314, 318, 322) connected to a computer system supporting an embodiment of the treeview tool via the network 312. For example, the hierarchical information can be dynamically collected from multiple sources by a server-based application/database/operating system and delivered to and/or accessed by the end-user computer system supporting the treeview hierarchical search and presentation tool. The treeview search and presentation methods and techniques can reside within software tools and services implemented upon, or embedded within, the end-user computer 310 or server computer systems (314, 318 or 322) as described above, and/or within network devices such as routers, switches and hubs (not shown) within the network 312.

The end-user computer system 310 can be a conventional personal or other suitable computer system (e.g., lap top, desktop, PDA, etc.) preferably equipped with a display or monitor 302, a system unit 304 (e.g., including the processor, memories and internal or external communications devices (e.g., modem, network cards, etc.)), a keyboard or other entry device 306 and optional mouse 308 or other pointing device. End-user computer system 310 includes software (e.g., operating system, HTML 2.0 compliant Internet browser, etc.) and appropriate components (e.g., processor, disk storage or hard drive, etc.) having sufficient processing and storage capabilities to effectively execute the software. Preferably, the end-user system uses any one of the major operating systems.

Similarly, a server system (314, 318, 322) is typically implemented by a conventional personal or other suitable computer system and preferably equipped with a system unit (e.g., including the processor, memories and internal or external communication devices (e.g., modem, network cards, etc.)) and optional display and input devices (e.g., a keyboard or other entry device, a mouse or other pointing device, etc.). The server system can includes software (e.g., operating system, server software, search engine software, a relational database management system, etc.) to communicate with end-user system 310 and process requests, and appropriate components (e.g., processor, disk storage or hard drive, etc.) having sufficient processing and storage capabilities to effectively collect and correlate hierarchical information from one or more sources. A server system preferably uses any of the commercially available operating systems, databases and/or server software, and, under software control, can employ any search engine that supports the collection of hierarchical information.

Figure 7:
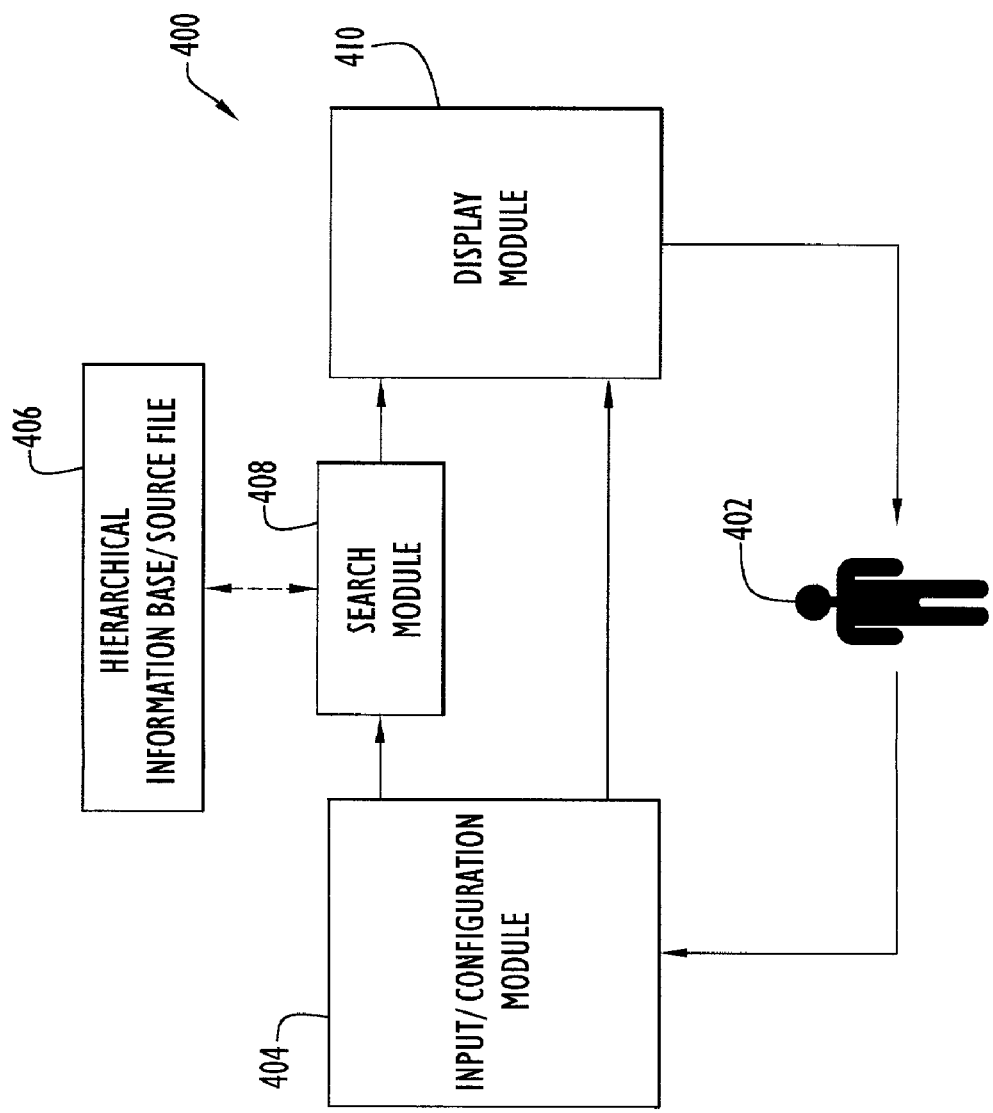
FIG. 7 is a non-limiting, representative system level block diagram of a enlighten treeview tool.

FIG. 7 depicts a non-limiting, representative diagram of components that comprise an enhanced treeview tool 400 that supports the methods and techniques described herein. These components include program instructions recorded on a computer-readable medium, such as a magnetic disk, optical disk, semiconductor memory, or other computer readable medium. A search module 408 that accesses a hierarchical information source 406 and retrieves information recorded therein that it passes to a display module 410. The display module 410 organizes and displays the information received into a treeview representation that it displays to a user 402 via a GUI interface similar to the non-limiting representative GUI display embodiments presented in FIGS. 9-13. Via an input/configuration module 404, the user is able to browse the information hierarchy treeview by scrolling up and down and expanding and contracting treeview branches, as previously discussed, using keyboard commands, directional arrows, and/or input from a pointer devices such as a mouse or track-ball.

If at any point the user is interested in locating occurrences of a specific element within an enlightened treeview enabled information hierarchy, the user can, via the input/configuration module 404, select a desired element and initiate a search for matching elements within the hierarchy. In one non-limiting representative embodiment a search is initiated by using directional keys on a computer keyboard to descend or ascend through the information hierarchy until the desired element is highlighted and pressing one of several pre-designated keys (e.g., a standard keyboard function key F1-F12) to initiate a search. In a second non-limiting representative embodiment a search is initiated by using a pointing device, such as a computer mouse, via techniques such as right-double-clicking a selected element. In a third non-limiting representative embodiment a search is initiated by browsing the hierarchy with a pointing device such as a mouse or track-ball, right clicking upon an element from the hierarchy and selecting the type of search desired from a pop-up menu that can include such options as "find all" (to find all occurrences of the element within the hierarchy), "find next" (to find the next occurrence of the element within the hierarchy), "find above" (to find the occurrences of the element within the hierarchy above the selected element), or "find below" (to find the occurrences of the element within the hierarchy below the selected element). In such an embodiment, a search pop-up window can be invoked via the GUI menu or via a pre-designated function key or keystroke that allows comprehensive search criteria to be specified. For example, one non-limiting representative embodiment of a search pop-up window facilitates the construction of a search criteria that can contain search strings, wild-card variables, uppercase sensitivity/insensitivity, and/or limitations on the portions of the hierarchy to be searched, etc.

The input and configuration module 404 provides an interface between the user and the treeview presentation tool that supports the receipt of display configuration parameters and browsing/search instructions via the keyboard and/or pointing device supported by the computer device upon which the treeview application is executed. The Input and Configuration Module 404 interfaces with and is supported by the GUI/operating system services running on the computer device upon which the treeview application is executed. User browsing instructions and display configuration information is relayed directly from the Input/Configuration Module 404 to the Display Module 410, and used to update the treeview information hierarchy displayed to the user. Search instructions are relayed from the Input/Configuration Module 404 to a Search Module 408 that then searches the Information Source/Data file 406 and presents updated search results to the Display Module 410. The Display Module 410 then updates the information displayed to the user in accordance with the current configuration parameters received from the Input/Configuration Module 404.

A non-limiting representative embodiment of the enhanced treeview techniques described above has been implemented as a software prototype written in JAVA 1.3. The GUI for the prototype was implemented using the JAVA SWING object oriented development language. To implement the software prototype, an information hierarchy was built by storing a search result as a linked list and then displaying the linked list as a treeview hierarchy according to the following non-limiting representative software code:

```
public LinkedList nodeSel_MarkTree(DefaultMutableTreeNode node)
{
    //set selection color as blue
    //treeRender.setBackgroundSelectionColor(new Color(204, 204, 255));
    //Mark tree
    tree.clearSelection( );
    tree.updateUI( );
    LinkedList allMarkedList = new LinkedList( );
    //find other same nodes and store in "allMarkedList"
    treeHandler.findSameNodeInTree(root, node, allMarkedList);
    //make sure they are expanded if in highlight or line condition
    if ((actionCode == 2) || (actionCode == 4)) {
        for (int i = 0; i < allMarkedList.size( ); i++) {
            DefaultMutableTreeNode theNode =
(DefaultMutableTreeNode)allMarkedList.get(i);
            TreePath treePath = new TreePath(theNode.getPath( ));
            tree.makeVisible(treePath);
        }
    }
    //Mark selected nodes selection
    TreePath treePath = new TreePath(node.getPath( ));
    tree.addSelectionPath(treePath);
    return allMarkedList;
}
```

Figure 4:
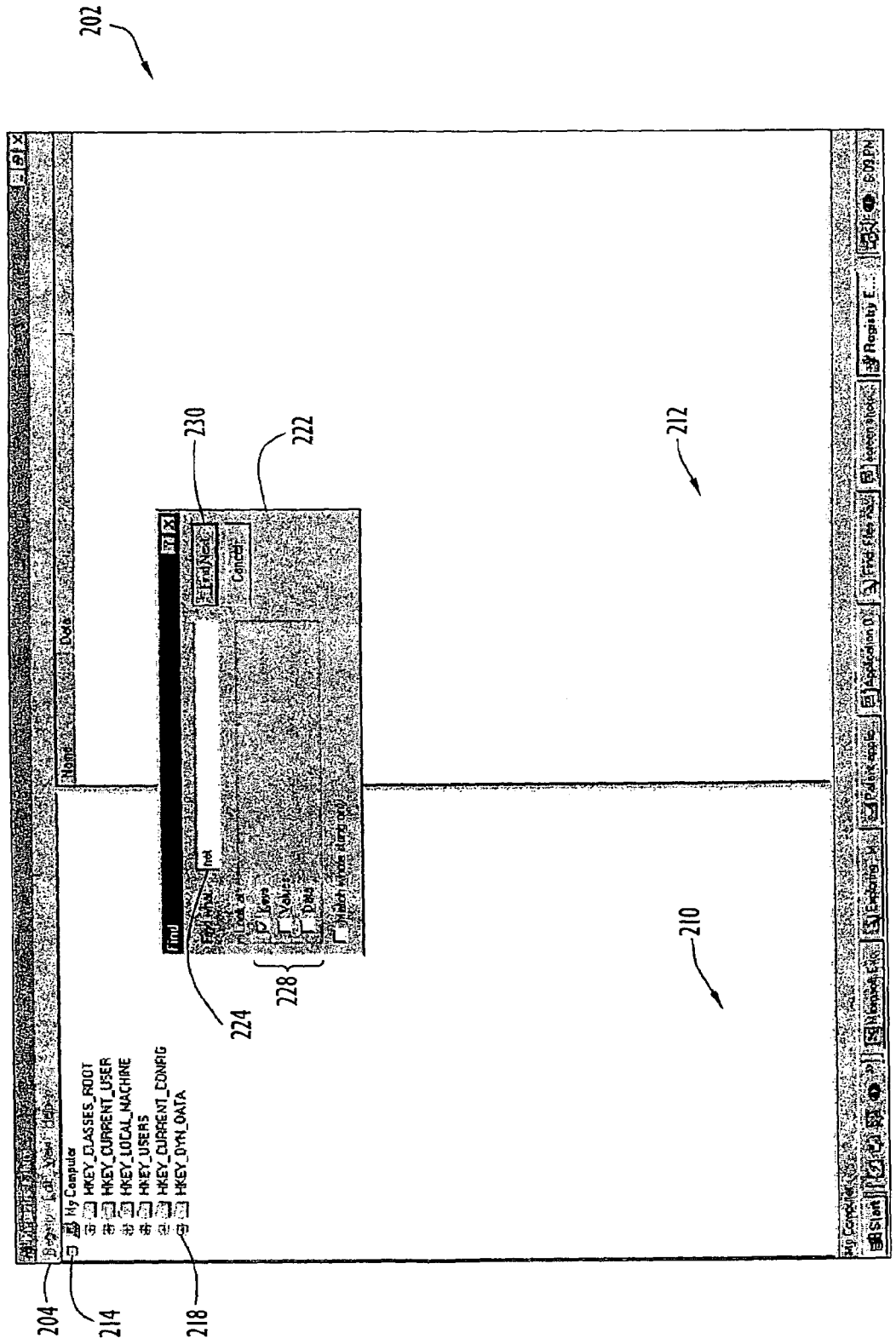
FIG. 4 is a recorded screen display depicting a second application embedding a traditional treeview display and the second application's search pop-up window.
Figure 5:
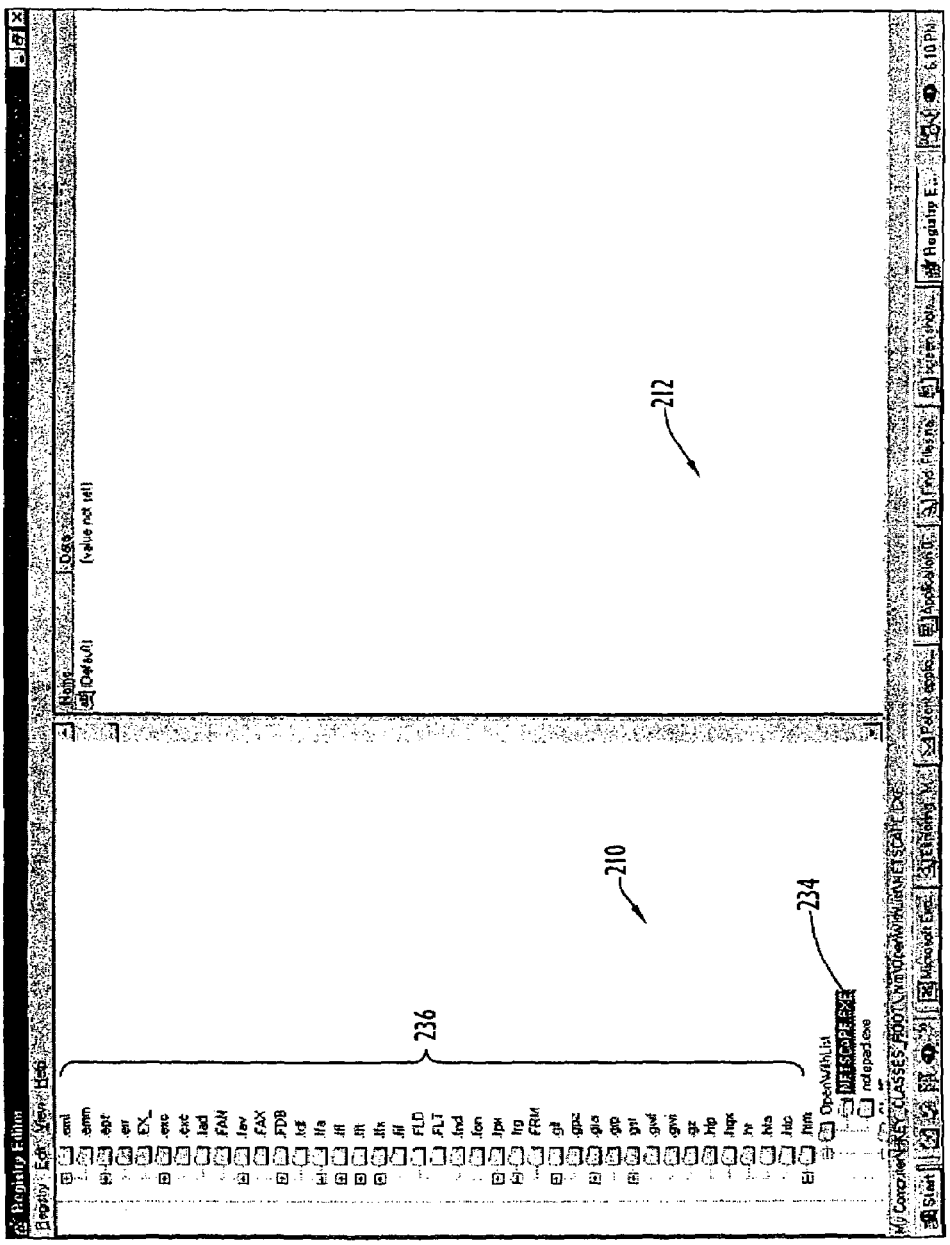
FIG. 5 is a recorded screen display depicting search results as presented by the second application.

As previously discussed in relation to FIG. 4, the tree view GUI is updated and refreshed each time a new search criteria is provided (e.g., a tree node is clicked.) The following non-limiting representative software code is used within the JAVA prototype to display the enhanced tree hierarchy in accordance with the non-limiting representative display embodiments addressed in FIGS. 9 through 13 (i.e., highlight, popup dialog, line presentation and non-enhanced/traditional tree view).

```
void nodeSelected(DefaultMutableTreeNode node, MouseEvent event) {
    //Update right panel
    propList.setListData(nodeSel_updateList(node));
```

-continued

```
                propList.updateUI( );
                //Find search result nodes
                //SecondColor is for Highlight condition, but the result is also
                    used for other conditions
                secondColor = nodeSel_MarkTree(node);
                //clear the previous second color and lines
                getRenderer( ).setColorList(null);
                ((JLineTree)tree).clearLines( );
                //control condition
                if (actionCode == 1) {return;
                }
                //Highlight the tree
                if (actionCode == 2) {
                        //clear the second color and lines
                        getRenderer( ).setColorList(sccondColor);
                }
                //popup and find Next
                if (actionCode == 3) {
                        //build popupMenu items
                        popup.removeAll( );
                        if (secondColor.size( ) > 0) {
                                JMenuItem menuItem = new JMenuItem("There are"+
(secondColor.size( )+1) +"nodes");
                                popup.add(menuItem);
                                menuItem = new JMenuItem("Find next");
                                menuItem.addActionListener(this);
                                popup.add(menuItem);
                                //show popupMenu
                                popup. show(event.getComponent( ), event. getX( ),
event.getY ( ));
                        }
                }
                //Line the tree nodes
                if (actionCode == 4) {
                        //get xPoints and yPoints
                        if (secondColor.size( ) <= 0) {
                                return; //no need for lines
                        }
                        int n = secondColor.size( ) + 1;
                        int[] xPoints = new int[n*2];
                        int[] yPoints = new int[n*2];
                        TreePath treePath = new TreePath(node.getPath( ));
                        Rectangle nodeBound = tree.getPathBounds(treePath);
                        int x = (int)(nodeBound.getX( ) + nodeBound.getWidth( ) - 3);
                        int y = (int)(nodeBound.getY( ) + nodeBound.getHeight( ) - 10);
                        xPoints[0] = x;
                        yPoints [0] = y;
                        xPoints[1] = x+100;
                        yPoints[1] = y;
                        int max_x = x+100;
                        for (int i=1;i<n; i++) {
                                DefaultMutableTreeNode theNode =
(DefaultMutableTreeNode)secondColor.get(i-1);
                                treePath = new TreePath(theNode.getPath( ));
                                nodeBound = tree.getPathBounds(treePath);
                                x = (int)(nodeBound.getX( ) + nodeBound.getWidth( ) - 3);
                                y = (int)(nodeBound.getY( ) + nodeBound.getHeight( ) - 10);
                                xPoints[2*i] = x;
                                yPoints[2*i] = y;
                                xPoints[2*i+1] = x + 100;
                                yPoints[2*i+1] = y;
                                //reset max_x if necessary
                                if(max_x < x + 100) max_x = x+100;
                        }
                        //set max_x to points
                        for (int i=0; i<n; i++) {
                                xPoints[2*i+1] = max_x;
                        }
                        ((JLineTree)tree).setXPoints(xPoints);
                        ((JLineTree)tree).setYPoints(yPoints);
                        ((JLineTree)tree).repaint( );
                }
        }
    }
```

Figure 8:
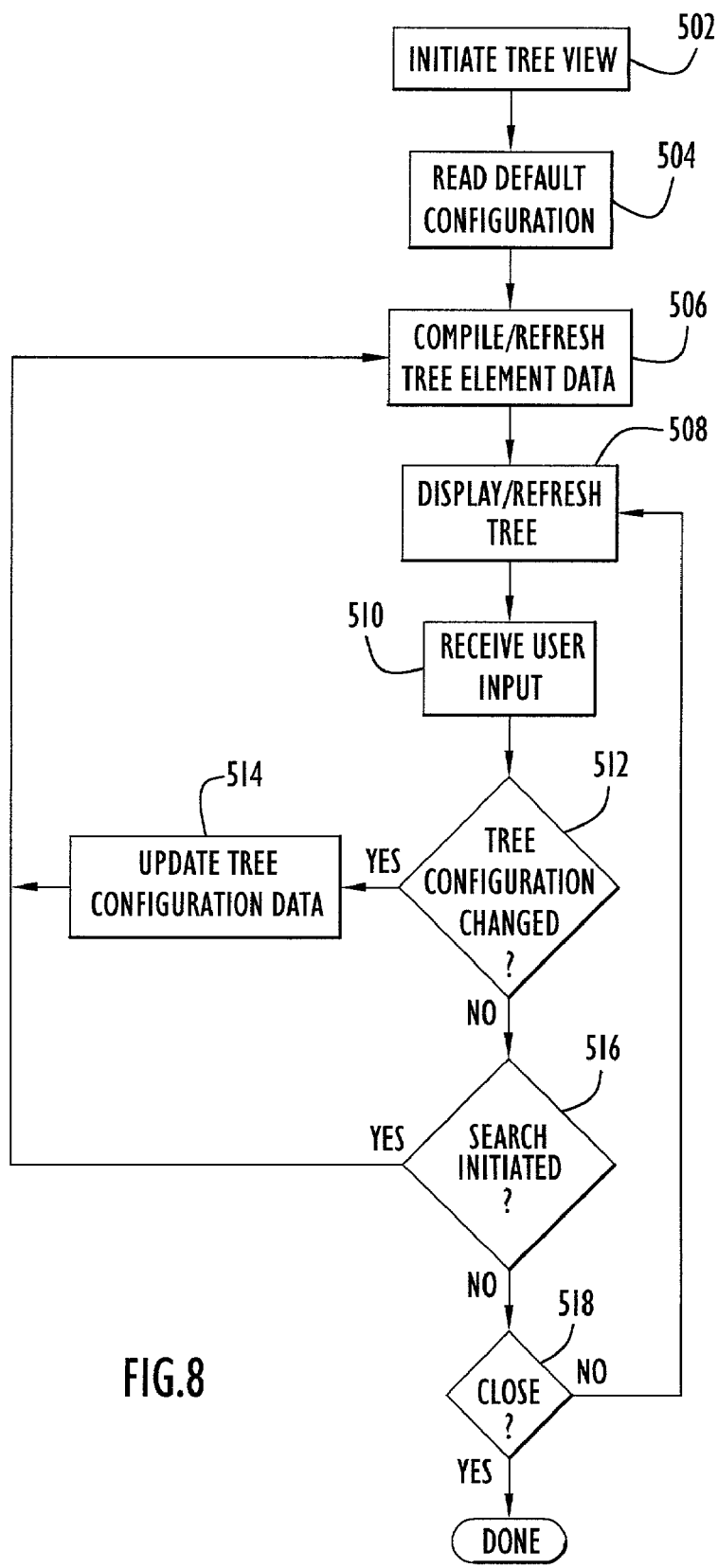
FIG. 8 is a non-limiting, representative flow chart illustrating the process associated with use of the enlighten treeview tool to browse and search an information hierarchy.

FIG. 8 presents a non-limiting, representative operational flow that describes the operation and use of an enhanced treeview application. Upon initiation of a treeview enabled application (operation 502) the search module retrieves default search criteria and the display module retrieves default configuration parameters from the input/configuration module (operation 504). Using the retrieved search criteria the search module accesses the information source/data file to compile treeview element data (operation 506) that is relayed to the display module. The display module uses the element data received from the search module and the configuration values retrieved from the input/configuration module to generate and display an enhanced treeview display (operation 508). At this point in the operational flow the user is able to view the treeview display and to browse the display using navigation devices, such as a computer mouse or trackball, supported by the input/configuration module to scroll up and/or down in the treeview and to expand and/or compress branches of the treeview (operation 510). If the user changes any configuration settings (operation 512), the treeview configuration data is updated (operation 514), the treeview elements are recompiled by the search module (operation 506) and the treeview display is refreshed by the display module to reflect new treeview configuration (operation 508). If the user initiates a search (operation 516) the search module recompiles the treeview elements based upon the new search criteria (operation 506) and the display module refreshes the treeview display to reflect the new search results (operation 508). This processes cycle repeats until the user closes the treeview application (operation 518).

FIGS. 9 through 13 present non-limiting representative embodiments of enhanced treeview displays that use different display techniques to emphasize the location of elements within the information hierarchy that have been located as a result of a user initiated search. As previously discussed, the information hierarchy presented via an enhanced treeview enabled tool can include elements representing any information that can be represented as an information hierarchy. The root element 614 depicted in FIG. 9 entitled "information catalog," therefore, is merely representative. There are no restrictions as to the identity and content of treeview elements. Furthermore, treeview sources of such hierarchical information can range from static local text files to dynamically compiled datasets composed of information retrieved from multiple sources residing upon a plurality of physically separate databases connected by a network, as described in relation to FIG. 6.

Figure 9:
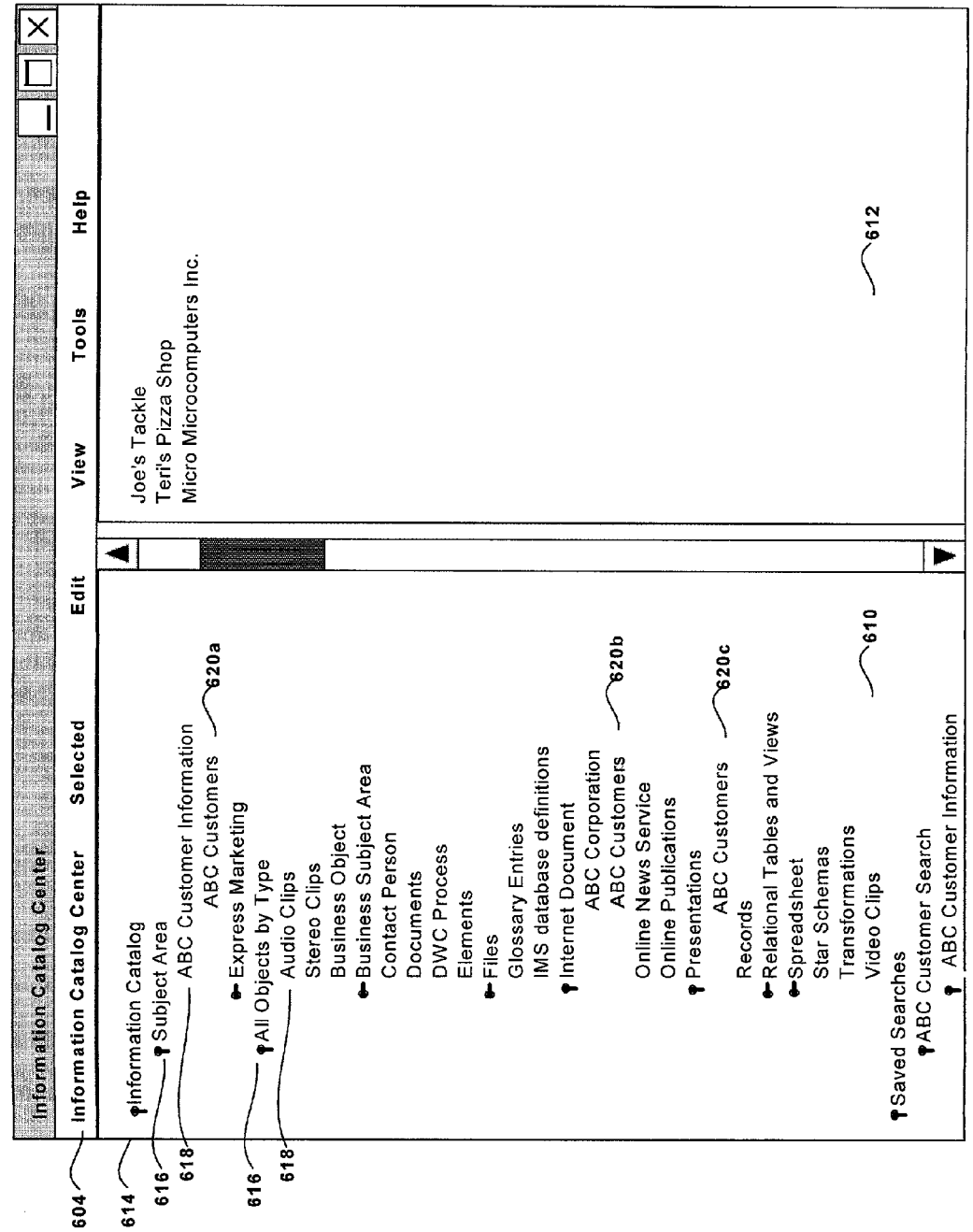
FIG. 9 is a first non-limiting representation of an enlightened treeview graphical user interface in which elements within the treeview that match search criteria are highlighted.
Figure 10:
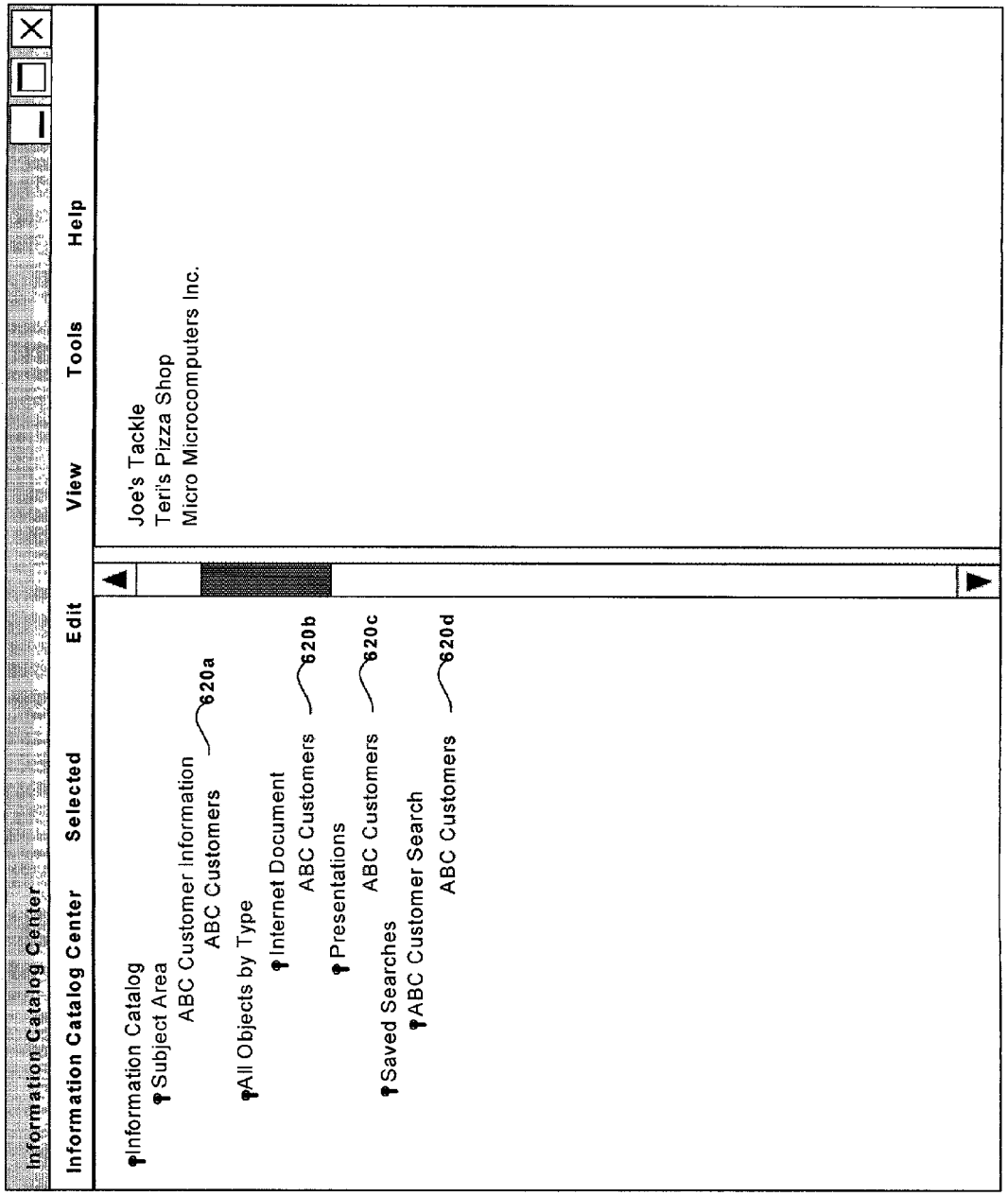
FIG. 10 presents the same search results presented in FIG. 9, within the context of a compressed treeview hierarchy.

In FIG. 9, elements that match the user specified search criteria are highlighted 620*a-c*. Clicking or right-clicking on an element within the treeview (e.g., "ABC Customers" in FIG. 9) initiates a search for all instances of that element in the hierarchy. In response to initiation of a search on a specified information element, the treeview is expanded so that matching elements are displayed within the context of the treeview and the matching elements are highlighted. In highly populated treeview displays, however, there may be so many elements within a single branch that upon expansion of the tree branch to show the matching element, very little, if any, of the treeview hierarchy is displayed on the screen. To accommodate such a situation, an alternate embodiment of the enlightened treeview (shown in FIG. 10) includes a user interface option that compresses branches of the treeview that do not contain matching elements. Furthermore, the user interface option can allow elements within a branch that do not match the search criteria to be hidden, as shown in FIG. 10. In this manner, the search results (620*a-d*) are presented in the context of a treeview information hierarchy, uncluttered by elements extraneous to the search results. Note that by compressing the treeview display, as shown in FIG. 10, additional matching elements (e.g. 620*d*) can be displayed to the user without scrolling.

Treeview search results are presented in the original treeview pane/window or in a separate treeview pane/window, and are presented in a compressed or non-compressed view, depending upon the user configuration parameters selected. For example, depending upon the user preferences selected, initiating a search can result in a display of the search results within the original treeview hierarchy pane/window, or presentation of a new treeview hierarchy pane/window that indicates the location of elements matching the search criteria within a second representation of treeview hierarchy. Regardless of the pane/window in which the search results are displayed, the search results are presented in the context of the treeview hierarchy. However, it should be noted that presentation of search results in a second treeview window has an added advantage of allowing the results of separate searches to be compared. Furthermore, displaying search results in a separate treeview hierarchy window is particularly helpful when the results are presented in a compressed treeview in which non-matching branch and leaf elements are hidden, for the original full treeview hierarchy remains available for reference regarding those treeview elements that are hidden.

Figure 11:
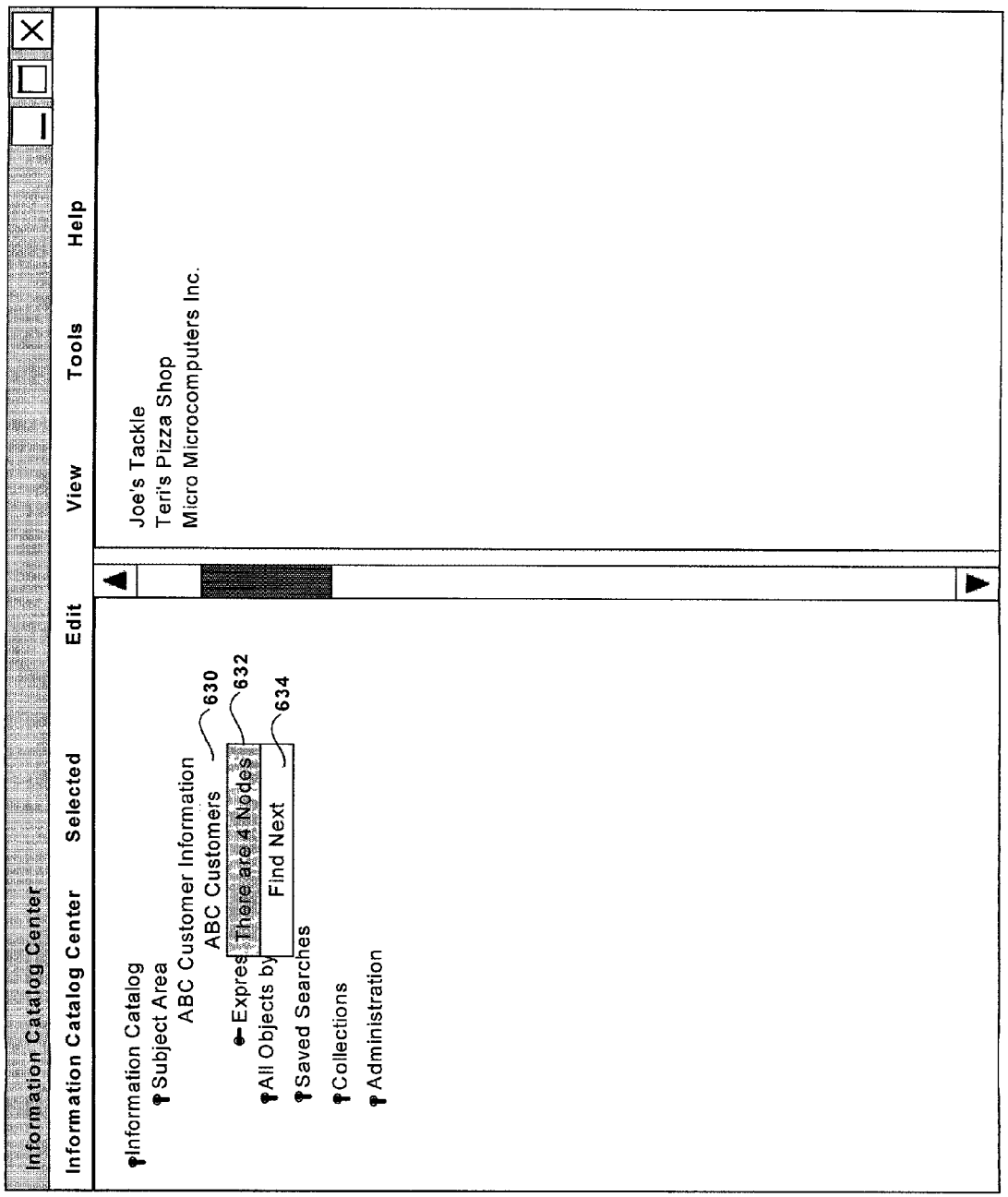
FIG. 11 is a second non-limiting representation of an enlighten treeview graphical user interface in which the first element within the treeview that matches the search criteria is highlighted and a pop-up window provides a link to the next matching element in the hierarchy.

FIG. 11, presents a non-limiting alternate embodiment to FIG. 9 in which only the first element 630 matching the search criteria is displayed and highlighted within the context of the enhanced treeview. A pop-up menu 632 is presented that identifies summary statistical information regarding the number of matching elements (e.g., the total number of elements matched) and provides a link to the next matching element. Clicking upon the link 634 expands the treeview hierarchy to reveal the next matching element within the treeview. Depending upon user configuration parameters selected, the branches related to the prior matching elements can either be compressed or remain expanded. As previously discussed, the search results can be displayed in the same or separate treeview hierarchy pane/window, depending upon user configured preferences.

Figure 12:
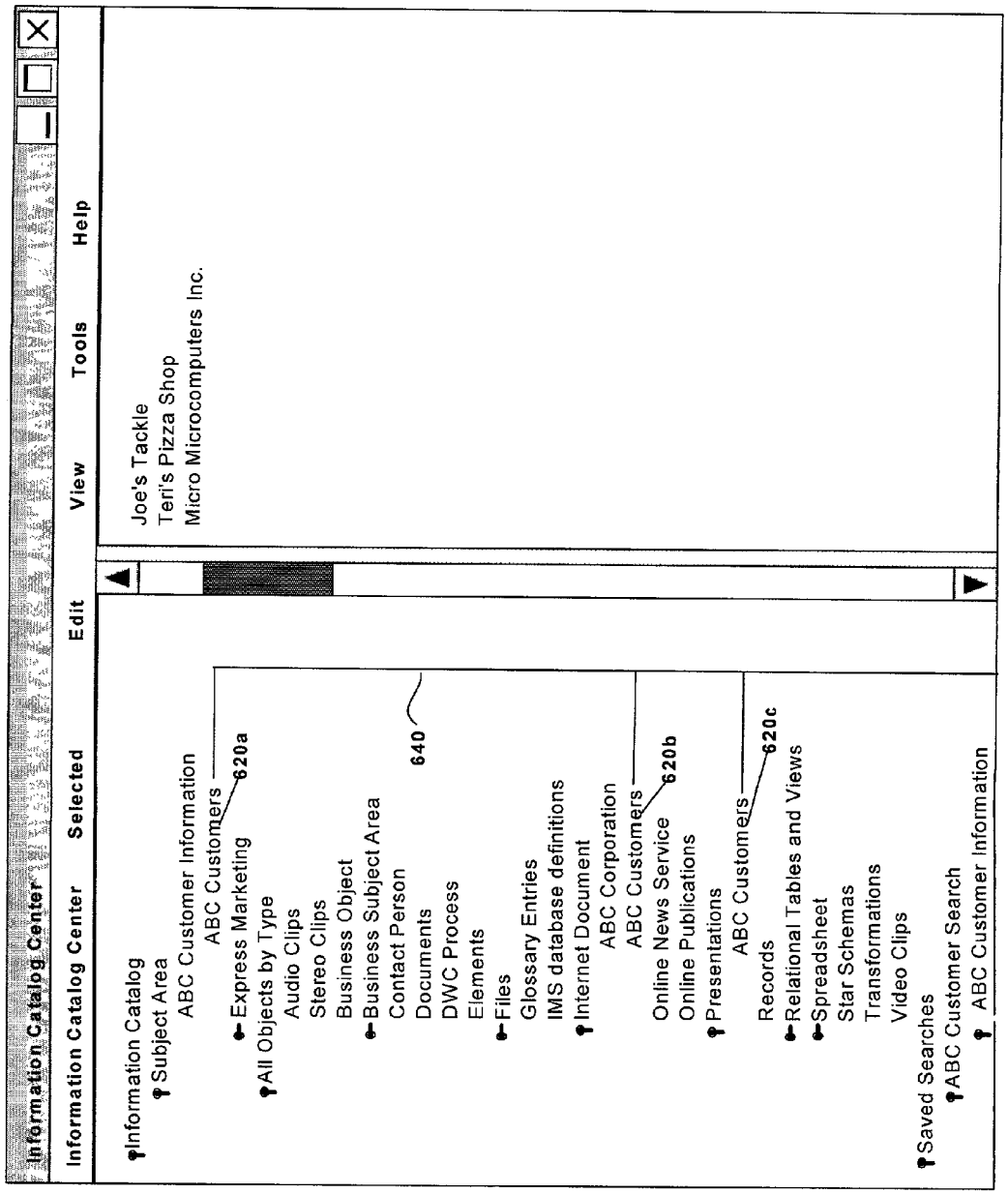
FIG. 12 is a third non-limiting representation of an enlighten treeview graphical user interface in which elements within the treeview that match the search criteria are graphically connected.
Figure 13:
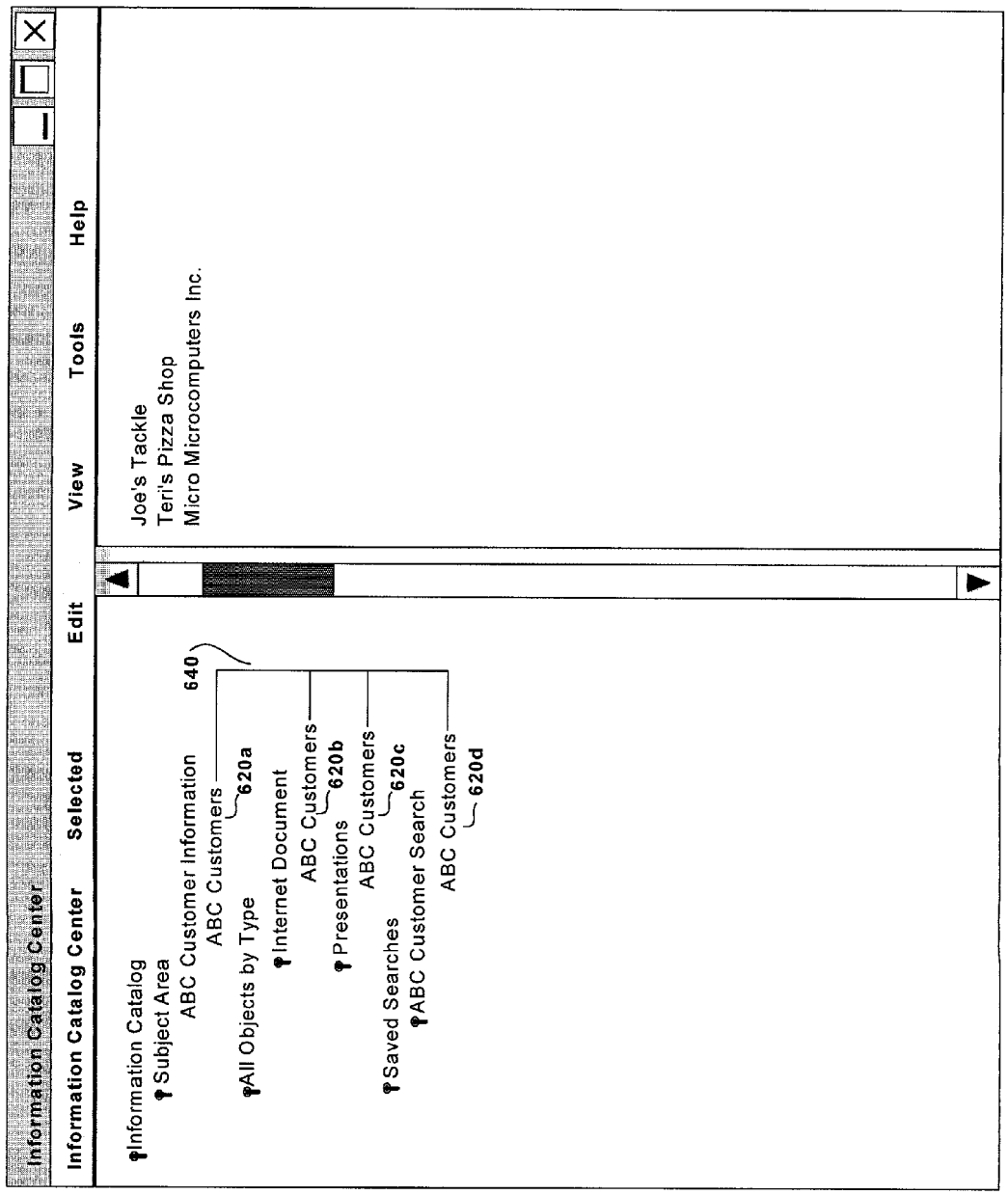
FIG. 13 presents the same search results presented in FIG. 12, within the context of a compressed treeview hierarchy.

FIG. 12, presents another non-limiting alternate embodiment to those presented in FIGS. 9 and 11. In FIG. 12, the treeview is expanded to reveal elements that match the user specified search criteria. Matching elements are graphically connected within the treeview display with a line 640. As previously discussed in relation to FIG. 10, the treeview hierarchy can be compressed (as shown in FIG. 13) using a user configuration option to hide any or all branches not containing matches and to hide any or all non-matching elements within expanded branches, while the hierarchical path from each matched element to its respective parents is displayed. Note that by compressing the treeview display, as shown in FIG. 13, additional matching elements (e.g. 620*d*) can be displayed to the user without scrolling. In one non-limiting representative embodiment of the enlightened treeview, if a user manually compresses a branch that contains one or more matching elements, the graphical line will point to the treeview element representing the compressed branch. Furthermore, as previously discussed, the search results can be displayed in the same or separate treeview hierarchy pane/window, depending upon user configured preferences.

In one non-limiting representative treeview enabled embodiment, an enlightened treeview is used to navigate and view a complex base of heterogeneous, hierarchically organized information (such as a combined information base containing a mix of hierarchically organized database structures, and hierarchically organized program source code). The left-hand pane displays a treeview comprised of branch elements (i.e., elements that can be expanded to reveal additional branch elements and leaf elements) and leaf elements (i.e., elements that represent pointers to stored information such as individual source code packages and data structures and, therefore, cannot be expanded to reveal additional elements).

Selecting (e.g., clicking upon) a leaf element results in the display of the contents of the leaf element in the right-hand pane. In such a treeview embodiment, the ability to easily and effectively search the treeview elements and to locate branch and leaf elements based upon a common search criteria and to view the matching elements within the treeview hierarchy provides a powerful mechanism for navigating a complex set of heterogeneous hierarchically organized information. Further, using the enhanced treeview techniques described in relation to FIGS. 9-13, allows the search results to be clearly, efficiently and effectively presented to the user.

With respect to the complex information base discussed above, a single search returns an enhanced treeview of the information that explicitly identifies all elements within the hierarchy information base matching the specified search. For example, clicking on an element named "organization_code" results in an enhanced treeview display that explicitly identifies all "organization_code" element within the information hierarchy, whether they occur in database or program code sections of the information hierarchy. Depending upon the user preferences selected, the enhanced treeview is displayed in any of the display formats presented in relation to the discussion of FIGS. 9-13.

Alternatively, the user can issue a complex search based upon criteria specified through a pop-up search window. For example, specifying "organization*" results in an enhanced treeview display that explicitly identifies all elements within the information hierarchy that begin with the string "organization*", whether they occur in database or program code sections of the information hierarchy. Depending upon user search preferences selected, the contents of leaf nodes are included in the initiated search. If such preferences are selected, all matching branch and leaf elements that match the search criteria will be identified in the enlightened treeview search results, including leaf elements whose contents satisfy the search criteria. Again, depending upon the user preferences selected, the enhanced treeview is displayed in any of the display formats presented in relation to the discussion of FIGS. 9-13.

The ability to easily locate and navigate complex information hierarchies using the enhanced treeview capabilities described above enhances the effectiveness of treeview enabled applications that allow a user to view and edit the contents of leaf elements within, for example, a second right-hand pane. In such embodiments, despite the complexity of the information hierarchy, related elements are quickly and easily identified and located within the context of the treeview hierarchy and made available for viewing, editing and/or execution. Such capabilities are useful in a wide range of potential treeview enabled applications, including software application development environments, file management application, and database development and administration.

It will be appreciated that the embodiments described above and illustrated in the drawings represent only a few of the many ways of implementing an enhanced treeview based tool that efficiently and effectively displays search results within the context of an information hierarchy.

The end-user and server computer systems described here can be implemented by any quantity of any personal or other type of computer system (e.g., APPLE, MACINTOSH, laptop, palm pilot, PDA, etc.). The computer systems of the present invention can include any commercially available operating system. These computer systems can further include commercially available or custom software (e.g., server software, browser software, etc.), and various types of input devices (e.g., keyboard, mouse, voice recognition, etc.). It is to be understood that the software for these computer systems can be implemented in virtually any desired computer language and can be developed by one of ordinary skill in the computer arts based on the descriptions contained here and the flow charts illustrated in the drawings. The computer systems, alternatively, can be implemented by hardware or other processing circuitry. The various functions of the computer systems can be distributed in a variety of manners among practically any quantity of computer or processing systems or circuitry and/or among practically any quantity of software and/or hardware units or modules. The software and/or algorithms described above and illustrated in the flow charts can be modified in a manner that accomplishes the functions described herein.

The network can be implemented by practically any communications network (e.g., LAN, WAN, Internet, Intranet, etc.). The server and end-user computer systems can include any conventional or other communications devices to communicate over the network. The database can be implemented by practically any quantity of conventional or other databases, storage units or structures (e.g., file, data structure, etc.), can be arranged in practically any fashion and can store practically any desired information. The information hierarchies can include practically any quantity of branches and branches may vary significantly with respect to the number of child branches and the density of elements upon each branch. The information hierarchies manipulated can have practically any quantity of elements for storing any type of information. An information hierarchy can be arranged in any suitable manner, while information can be placed in the hierarchy arrangement in any desired fashion for storage and retrieval. Element identifiers can be of practically any quantity and include alphanumeric or other characters or symbols.

The enhanced treeview modules, including the accompanying information hierarchy or database, can be implemented by practically any quantity of computer systems, and can reside on a server, end-user or other third-party computer system or practically any combination of these computer systems. The search module can accommodate practically any quantity of end-users or end-user treeview based systems. Moreover, the search module can search information stored in practically any type of storage structure (e.g., files, databases, etc.), whereby the information can reside on a stand-alone system or practically any quantity of systems connected via practically any type of network (e.g., LAN, WAN, Internet, etc.). The enhanced treeview modules can be recorded on recorded medium (e.g., floppy diskettes, CD-ROM, memory devices, etc.) for use on stand-alone systems or systems connected by a network, or can be downloaded (e.g., in the form of carrier waves, packets, etc.) to systems from a network.

The search module can search the hierarchy in practically any desired manner (e.g., any particular branch or combination of branches) and use practically any suitable criteria in practically any fashion for retrieving search results (e.g., exact matches, partial matches, etc.). Searches can treat the search text in practically any desired fashion (e.g., case sensitive, case insensitive, interpret characters in a particular way, etc.). Matches can be detected in practically any quantity of branches and/or elements.

The tree branch elements can be displayed and arranged in practically any fashion and can reflect practically any desired information order (e.g., alphabetical, ascending, descending, etc.). The search module can accommodate practically any quantity of text or search parameters.

The present invention is not limited to the specific applications disclosed herein, but can be used in substantially the same manner described above to search through practically any types of data or information arranged or categorized in practically any fashion.

Having described methods and apparatuses related to the operation and use of an enhanced treeview tool, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

What is claimed is:

1. A method for displaying a multilevel treeview of hierarchical information within a pane of a computer display window, comprising:
    searching an information hierarchy for a plurality of occurrences of a specified information element of the information hierarchy, based upon a search criteria;
    displaying within the pane the multilevel treeview of the information hierarchy;
    displaying within the multilevel treeview an indicator which indicates whether a displayed element of the information hierarchy comprises sub-elements, on one side of the multilevel treeview;
    indicating within the multilevel treeview locations of the plurality of found occurrences of the specified information element;
    graphically connecting via a graphical connection, only the plurality of occurrences of the specified information element within the multilevel treeview, the graphical connection being positioned on an opposite side from the indicator with respect to the multilevel treeview, and comprising:
        a plurality of horizontal lines extending outward from each displayed found occurrence of the specified information element, and
        a vertical line positioned to intersect an outward end of each of the plurality of horizontal lines, the vertical line being terminated between a horizontal line corresponding to a first displayed found occurrence of the specified information element and a last displayed found occurrence of the specified information element;
    selecting an occurrence of the specified information element within the multilevel treeview; and
    displaying a pop-up menu positioned directly beneath the selected occurrence of the specified information element, the pop-up menu comprising:
        statistical information on the total number of occurrences of the specified information element, and
        a link to a next occurrence of the specified information element.

2. The method of claim 1, wherein the multilevel treeview of the information hierarchy, indicating locations of the plurality of found occurrences of the specified information element, is a graphical view.

3. The method of claim 1, wherein indicating the locations of the plurality of found occurrences of the specified information element includes highlighting the plurality of found occurrences of the specified information element within the multilevel treeview.

4. The method of claim 1, further comprising graphically connecting a compressed branch of the information hierarchy containing a specified information element with the plurality of graphically connected found occurrences of the specified information element within the multilevel treeview.

5. The method of claim 1, wherein indicating the location of the plurality of found occurrences of the specified information element within the multilevel treeview includes compressing tree branches not containing an occurrence of the specified information element.

6. The method of claim 1, wherein indicating the location of the plurality of found occurrences of the specified information element within the multilevel treeview includes hiding elements that do not match the search criteria.

7. The method of claim 1, further comprising setting characteristics of the displayed multilevel treeview based upon an assessment of user configurable parameters.

8. The method of claim 1, further comprising the step of receiving the search criteria via an interface with a user.

9. The method of claim 1, further comprising the step of updating the multilevel treeview in response to a change in the search criteria and a user configurable parameter.

10. The method according to claim 1, wherein the search criteria is based on selecting an information element within the multilevel treeview of the information hierarchy.

11. The method of claim 1, further comprising expanding the information hierarchy to reveal another occurrence of the specified information element within the information hierarchy upon selection of the link.

12. The method according to claim 11, further comprising compressing the information hierarchy to hide other occurrences of the specified information element within the information hierarchy.

13. The method of claim 1, further comprising graphically connecting information elements within the information hierarchy to indicate hierarchy between the information elements within the multilevel treeview.

14. The method of claim 13, wherein a first graphical connector graphically connects only the plurality of found occurrences of the specified information element within the multilevel treeview and wherein a second graphical connector graphically connects all of the information elements within the multilevel treeview to indicate the hierarchy.

15. The method of claim 14, wherein the plurality of occurrences of the specified information element are only connected to each other with the first graphical connector and are connected by the second graphical connector with all of the information elements within the multilevel treeview, and wherein the first graphical connector is a separate connector from the second graphical connector.

16. The method of claim 14, wherein a level of the displayed multilevel treeview of the information hierarchy comprises at least one of the plurality of occurrences of the specified information element and the information elements of the information hierarchy.

17. The method of claim 1, wherein a first graphical connector graphically connects only the plurality of found occurrences of the specified information element within the multilevel treeview and wherein a second graphical connector graphically connects all information elements within the multilevel treeview to indicate hierarchy between the information elements within the multilevel treeview.

18. The method of claim 1, wherein a graphical connector, which connects only the plurality of found occurrences of the specified information element within the multilevel treeview, does not connect the plurality of found occurrences of the specified information element to respective parent nodes of the plurality of found occurrences of the specified information element.

19. The method of claim 1, wherein the information hierarchy is a multilevel information hierarchy.

20. The method of claim 1, wherein a level of the displayed multilevel treeview of the information hierarchy comprises at least one of the plurality of occurrences of the specified information element and information elements of the information hierarchy.

21. An article of manufacture comprising a computer readable medium having a program product executable by a computer embodied thereon for displaying a multilevel treeview of hierarchical information within a pane of a computer display window, the program product comprising:
   program instructions for searching an information hierarchy for a plurality of occurrences of a specified information element based upon a search criteria;
   program instructions for displaying within the pane the multilevel treeview of the information hierarchy;
   program instructions for displaying within the multilevel treeview, an indicator which indicates whether a displayed element of the information hierarchy comprises sub-elements, on one side of the multilevel treeview;
   program instructions for indicating within the multilevel treeview locations of the plurality of found occurrences of the specified information element;
   program instructions for graphically connecting via a graphical connection only the plurality of occurrences of the specified information element within the multilevel treeview, the graphical connection being positioned on an opposite side from the indicator with respect to the multilevel treeview, and comprising:
      a plurality of horizontal lines outward from each displayed found occurrence of the specified information element, and
      a vertical line positioned to intersect an outward end of each of the plurality of horizontal lines, the vertical line being terminated between a horizontal line corresponding to a first displayed found occurrence of the specified information element and a last displayed found occurrence of the specified information element;
   program instructions for selecting an occurrence of the specified information element within the multilevel treeview; and
   program instructions for displaying a pop-up menu positioned directly beneath the selected occurrence of the specified information element, the pop-up menu comprising:
      statistical information on the total number of occurrences of the specified information element, and
      a link to a next occurrence of the specified information element.

22. The article of manufacture of claim 21, wherein the multilevel treeview of the information hierarchy, indicating locations of the plurality of found occurrences of the specified information element, is a graphical view.

23. The article of manufacture of claim 21, wherein indicating the locations of the plurality of found occurrences of the specified information element includes highlighting the plurality of found occurrences of the specified information element within the multilevel treeview.

24. The article of manufacture of claim 21, further comprising program instructions for graphically connecting a compressed branch of the information hierarchy containing a specified information element with the plurality of graphically connected found occurrences of the specified information element within the multilevel treeview.

25. The article of manufacture of claim 21, wherein indicating the location of the plurality of found occurrences of the specified information element within the multilevel treeview includes compressing tree branches not containing an occurrence of the specified information element.

26. The article of manufacture of claim 21, wherein indicating the location of the plurality of found occurrences of the specified information element within the multilevel treeview includes hiding elements that do not match the search criteria.

27. The article of manufacture of claim 21, further comprising program instructions for setting characteristics of the displayed multilevel treeview based upon an assessment of user configurable parameters.

28. The article of manufacture of claim 21, further comprising program instructions for receiving the search criteria via an interface with a user.

29. The article of manufacture of claim 21, further comprising program instructions for updating the multilevel treeview in response to a change in the search criteria and a user configurable parameter.

30. The article of manufacture of claim 21, wherein a first graphical connector graphically connects only the plurality of found occurrences of the specified information element within the multilevel treeview and wherein a second graphical connector graphically connects all information elements within the multilevel treeview to indicate hierarchy between the information elements within the multilevel treeview.

31. An apparatus suitable for displaying a multilevel treeview of hierarchical information within a pane of a computer display window, comprising:
   an input unit configured to receive user configurable view characteristics and a search criteria;
   a search unit configured to search an information hierarchy for a plurality of occurrences of a specified information element based upon the search criteria; and
   a display unit configured to;
      display within the pane the multilevel treeview of the information hierarchy,
      display within the multilevel treeview an indicator which indicates whether a displayed element of the information hierarchy comprises sub-elements, on one side of the multilevel treeview,
      indicate the location of the plurality of found occurrences of the specified information element within the multilevel treeview;
      graphically connecting via a graphical connection only the plurality of occurrences of the specified information element within the multilevel treeview, the graphical connection being positioned on an opposite side from the indicator with respect to the multilevel treeview, and comprising:
         a plurality of horizontal lines extending outward from each displayed found occurrence of the specified information element, and
         a vertical line positioned to intersect an outward end of each of the plurality of horizontal lines, the vertical line being terminated between a horizontal line corresponding to a first displayed found occurrence of the specified information element and a last displayed found occurrence of the specified information element;
   the input unit further configured to receive a user selection of an occurrence of the specified information element within the multilevel treeview; and the display unit further configured to display a pop-up menu positioned directly beneath the selected occurrence of the specified information element, the pop-up menu comprising:
- statistical information on the total number of occurrences of the specified information element, and
- a link to a next occurrence of the specified information element.

32. The apparatus of claim 31, wherein the multilevel treeview of the information hierarchy, indicating locations of the plurality of found occurrences of the specified information element, is a graphical view.

33. The apparatus of claim 31, wherein indicating the locations of the plurality of found occurrences of the specified information element includes highlighting the plurality of found occurrences of the specified information element within the multilevel treeview.

34. The apparatus of claim 31, wherein the display unit is further configured to graphically connect a compressed branch of the information hierarchy containing a specified information element with the plurality of graphically connected found occurrences of the specified information element within the multilevel treeview.

35. The apparatus of claim 31, wherein indicating the location of the plurality of found occurrences of the specified information element within the multilevel treeview includes compressing tree branches not containing an occurrence of the specified information element.

36. The apparatus of claim 31, wherein indicating the location of the plurality of found occurrences of the specified information element within the multilevel treeview includes hiding elements that do not match the search criteria.

37. The apparatus of claim 31, wherein the display unit is further configured to set characteristics of the displayed multilevel treeview based upon an assessment of user configurable parameters.

38. The apparatus of claim 31, wherein the input unit is further configured to receive the search criteria via an interface with a user.

39. The apparatus of claim 31, wherein the display unit is further configured to update the multilevel treeview in response to a change in the search criteria and a user configurable parameter.

40. The apparatus of claim 31, wherein a first graphical connector graphically connects only the plurality of found occurrences of the specified information element within the multilevel treeview and wherein a second graphical connector graphically connects all information elements within the multilevel treeview to indicate hierarchy between the information elements within the multilevel treeview.

* * * * *